(12) United States Patent
McKnight et al.

(10) Patent No.: US 11,097,993 B2
(45) Date of Patent: *Aug. 24, 2021

(54) EFFICIENCY OF MAN-MADE AND/OR NATURAL ORGANIC BASED ANIMAL MANURE FERTILIZERS BY LIBERATING THE BOUND NUTRIENTS (MACRO AND MICRO) THROUGH THE USE OF ORGANIC, NON-AQUEOUS LIQUID DELIVERY FORMULATIONS CONTAINING ORGANIC POLY (ORGANICACIDS) AND/OR THEIR SALTS

(71) Applicant: World Source Enterprises, LLC, Charleston (KN)

(72) Inventors: Gary David McKnight, High Point, NC (US); Randall Linwood Rayborn, Burlington, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/687,442

(22) Filed: Nov. 18, 2019

(65) Prior Publication Data

US 2020/0079706 A1 Mar. 12, 2020

Related U.S. Application Data

(63) Continuation of application No. 15/893,593, filed on Feb. 10, 2018, now Pat. No. 10,513,469, which is a continuation of application No. 14/740,327, filed on Jun. 16, 2015, now Pat. No. 10,301,230.

(60) Provisional application No. 61/991,680, filed on May 12, 2014.

(51) Int. Cl.
| | | |
|---|---|---|
| *C09D 7/20* | (2018.01) |
| *C05C 9/00* | (2006.01) |
| *C05D 9/00* | (2006.01) |
| *C05D 9/02* | (2006.01) |
| *C05B 7/00* | (2006.01) |
| *C05G 3/00* | (2020.01) |
| *C05G 3/90* | (2020.01) |
| *C05G 5/30* | (2020.01) |
| *C05F 3/00* | (2006.01) |
| *C05B 3/00* | (2006.01) |
| *C05B 17/00* | (2006.01) |
| *C05B 17/02* | (2006.01) |
| *C05G 3/70* | (2020.01) |

(52) U.S. Cl.
CPC .............. *C05G 5/37* (2020.02); *C05B 3/00* (2013.01); *C05B 7/00* (2013.01); *C05B 17/00* (2013.01); *C05B 17/02* (2013.01); *C05C 9/00* (2013.01); *C05C 9/005* (2013.01); *C05D 9/00* (2013.01); *C05D 9/02* (2013.01); *C05F 3/00* (2013.01); *C05G 3/00* (2013.01); *C05G 3/70* (2020.02); *C05G 3/90* (2020.02); *C05G 5/30* (2020.02); *C05G 5/36* (2020.02); *C09D 7/20* (2018.01); *Y02A 40/20* (2018.01); *Y02P 20/145* (2015.11)

(58) Field of Classification Search
None
See application file for complete search history.

(56) References Cited

U.S. PATENT DOCUMENTS

| | | | | |
|---|---|---|---|---|
| 6,364,926 B1* | 4/2002 | Gryzik | ................... | C05G 5/20 |
| | | | | 71/64.1 |
| 10,301,230 B2* | 5/2019 | McKnight | ................ | C05D 9/02 |
| 10,464,858 B2* | 11/2019 | McKnight | ................ | C05G 5/36 |
| 10,494,311 B2* | 12/2019 | McKnight | ............... | A01N 25/26 |
| 10,513,469 B2* | 12/2019 | McKnight | ................ | C05G 5/37 |
| 2007/0095118 A1* | 5/2007 | Evers | ........................ | C05C 9/00 |
| | | | | 71/28 |
| 2013/0174623 A1* | 7/2013 | Gabrielson | .............. | C05G 3/20 |
| | | | | 71/29 |

* cited by examiner

*Primary Examiner* — Wayne A Langel
(74) *Attorney, Agent, or Firm* — Ben Schroeder Law, PLLC

(57) ABSTRACT

The present invention relates to improving the efficacy of man-made and/or natural organic-based animal manure fertilizers by administration of an organic solvent formula containing polyorganic acids and/or their salts. The formulation liberates nutrient(s) that are normally bound in the soil as insoluble salts and complexes. These delivery formulations also provide an environmentally sound and inherently safe solvating system that improves diffusion of polyorganic acids to the granule fertilizer. These delivery formulations enable safe storage, transport and subsequent application or blending with solid or liquid fertilizers. The combined formulation and fertilizer can be applied to soil to provide improved efficacy of fertilizer by liberating nutrients bound in the soil for uptake by plant life.

20 Claims, No Drawings

EFFICIENCY OF MAN-MADE AND/OR NATURAL ORGANIC BASED ANIMAL MANURE FERTILIZERS BY LIBERATING THE BOUND NUTRIENTS (MACRO AND MICRO) THROUGH THE USE OF ORGANIC, NON-AQUEOUS LIQUID DELIVERY FORMULATIONS CONTAINING ORGANIC POLY (ORGANICACIDS) AND/OR THEIR SALTS

This application is a continuation of and claims priority under 35 USC 120 to U.S. application Ser. No. 15/893,593 filed Feb. 10, 2018, which in turn is a continuation of and claims priority to U.S. application Ser. No. 14/740,327 filed Jun. 16, 2015, which in turn claims priority under 35 USC 119(e) to U.S. Provisional No. 61/991,680 filed May 12, 2014.

FIELD OF INVENTION

The present invention relates to improving the efficiency of man-made and/or natural organic-based animal manure fertilizers by administration of an organic solvent formula containing poly (organic acids) and/or their salts that liberates the nutrient(s) bound in the soil as insoluble salts and complexes. The compositions and methods of the present invention result in a flowable, low moisture liquid that can be readily mixed with liquid fertilizers or applied evenly on the surface of solid fertilizer granules.

BACKGROUND OF THE INVENTION

Agriculture currently utilizes fertilizers to deliver the needed nutrients (macro and micro) to plants through the application of these fertilizers to the soil. Fertilizers can be formulated as man-made products and/or natural organic based animal manure. These nutrients are absorbed from soil by plants to sustain their growth. Phosphorous is second to nitrogen as the most limiting macronutrient. In the case of phosphorus fertilizer, 40% of landscape soil is considered to contain inadequate levels of phosphorus for woody plant growth. Moreover, most of the phosphorus is largely inaccessible as it is in a form that is not soluble in water (and thus are not available to plants). In some cases, only 0.01% of the total soil phosphorus is in the form of a water soluble ion, the only form which can be absorbed by the plant. Adequate and accessible soil phosphorus is essential for optimal crop yields. Phosphorus enables a plant to store and transfer energy, promotes root, flower and fruit development, and allows early maturity. Phosphorus is also involved in many processes critical to plant development such as photosynthesis where plants utilize organic phosphorous compounds when converting sunlight to energy. Without enough phosphorus present in the soil, plants cannot grow sufficient root structure, which is key to the plant's ability to absorb water and nutrients from the soil. Moreover, woody plants without sufficient root structure cannot maintain an equilibrium between roots and shoots, which is key to surviving drought, windy weather, and/or pests. Other nutrients such as calcium, magnesium, sulfur, manganese, zinc, iron, and the like can also be locked into the soil in insoluble salts and complexes. Often, these nutrient-insoluble salts and complexes contain a phosphate anion that results from the reaction of fertilizer components containing mono and/or di-ammonium phosphates with metal cations when the fertilizer is applied to the soil. The presence of water in the soil provides an ideal medium, promoting the reaction that results in the formation of these insoluble salts and complexes.

Because fertilizers containing phosphorus are important in agriculture, it would seem that using more stable cations (such as sodium and/or potassium phosphates) versus the largely unstable ammonium phosphate would tend to limit the formation of these insoluble salts and complexes, leading to less pollution (and more available phosphorous for plants). However, in practice, the relatively high solubility of the ammonia, sodium and/or potassium phosphate cause them to be released into our waterways, creating deleterious effects. One such effect of water soluble phosphorus salts that is washed into lakes or rivers is eutrophication. Eutrophication occurs in a lake or river when undesirable algae and/or underwater weeds grow as the result of increased nutrient supply. This generally causes low water oxygen concentrations and clogged waterways, which sometimes leads to the loss of aquatic animals (such as fish) and other aquatic plants.

To address this issue, some states (in the US) and countries are beginning to regulate the usage of phosphorus in fertilizers to decrease eutrophication. Thus, it would desirable to optimize fertilizer performance so that the requisite amount of nutrients (including phosphorous) be delivered to soil in a timely manner thereby allowing plants to grow at levels that are economically and environmentally viable. Accordingly, a fertilizer additive that will allow the slow conversion and release of the requisite nutrients (that may be in the form of insoluble salts and complexes) will not only decrease the degree of pollution, but it will also reduce the cost of the fertilizer by improving efficiency in a time sensitive manner allowing the requisite nutrients to be released over a longer duration of time. The advantage of this additive would be that nutrients would be more readily available over longer time periods, resulting in plants that are not only healthy and grow well, but ultimately produce higher yields.

DESCRIPTION Of RELATED ART

To present, multiple products have been developed to try to increase the efficiency of the release of phosphorus in fertilizer as well as the release of nutrients bound in the soil as insoluble salts and complexes. The mechanisms of action for the vast majority of these products are similar. When a fertilizer containing phosphorus is applied to the soil, most of the phosphorous is in a water-soluble phosphate ion form, the only form of phosphorus that is readily absorbed by the plant. In the presence of moisture/water, however, these soluble phosphate anions will be attached to metal ions such as calcium, magnesium, iron, aluminum and the like. These salts have very low solubility in water and thus, cannot be readily absorbed by plants. Polymers with negatively charged ions can chelate/complex with the metal ions resulting in a freed, water-soluble phosphate anion with the cation (such as calcium, magnesium, sulfur, manganese, zinc, iron, and the like) complexed with the poly (organic acid). Both the phosphate anion and the poly (organic acid) complexed cation are now more readily available to plants for absorption. Various methods or variations of the above described mechanism are listed in the patents below, which are incorporated by reference in their entireties. These methods have been proposed and developed for the slow release of nutrients bound in the soil in the form of insoluble salts and complexes.

Boehmke (U.S. Pat. No. 4,839,461) teaches how to synthesize and use a man-made version of polyaspartic acid and its salts that prevents incrustations formed by the metal ions that are responsible for hard water. Boehmke further discloses that this compound can be used as a fertilizer.

Ashmead (U.S. Pat. No. 4,172,072) discloses the use of protein sources to form metal proteinates, which are in a biologically accepted form. Others reveal carboxylic containing entities either as monomers or as polymers such as Danzig (U.S. Pat. No. 4,799,953), which utilizes polymers of thiolactic acid or thioglycolic acid and thiolactic acid, dithiobispropanoic acid and dithiobisacetic acid, Kinnersley (U.S. Pat. No. 4,813,997), which utilizes glycolic and/or lactic acid, and Young (U.S. Pat. Nos. 4,863,506 and 5,059,241) that disclose that d-lactic acid can promote increased plant growth, increased concentration of chlorophyll, and increase the rate of root formation.

Gill (U.S. Pat. No. 5,047,078) utilized scale inhibiting compounds such as those based on polymers of ethylenically unsaturated carboxylic acids and/or maleic acid/anhydride monomers and/or phosphorous based chelators such as dihydroxy ethylidene diphosphonic acid to make available nutrients bound in the soil as insoluble salts and complexes resulting in increased growth and yields.

Kinnersley (U.S. Pat. Nos. 5,350,735 and 5,593,947) and Koskan (U.S. Pat. Nos. 5,783,523 and 5,814,582) teach using poly (organic) acids like poly (amino acids) such as poly(aspartic) acid to enhance fertilizer uptake and promote plant growth.

Sanders (U.S. Pat. Nos. 6,753,395, 6,756,461, 6,818,039, and 8,041,995) demonstrate that man-made poly (organic acids) based on maleic, itaconic and/or citraconic anhydrides can be utilized to enhance nutrient uptake by plants.

Sanders (U.S. Pat. Nos. 8,016,907 and 8,025,709) shows the importance of having a quick drying product that one can apply to the surface of granules for fertilizer. Sanders accomplishes this by using 10-50% of a volatile alcohol such as methanol.

Many of these disclosures are now available in the marketplace. A 30% aqueous solution of sodium salt of a maleic itaconic copolymer, (U.S. Pat. No. 6,515,090 to Sanders), is marketed under the brand name Avail. Another polymer containing 40% sodium poly-lysine aqueous solution is marketed as P-Max in the US market. A similar polymer, poly-aspartate was also used for this purpose (U.S. Pat. No. 5,350,735 to Kinnersley). In the market, a composition that contains 30% aqueous solution of sodium poly-aspartate is marketed as X10D (Flexible Solution International). All of these products have been shown to increase the efficiency of phosphorus fertilizer in their field tests and have generally been shown to be biodegradable.

However, all these products suffer from the same drawback. Most fertilizers tend to be solid granules and water soluble. The above-stated inventions are almost exclusively based on aqueous solutions and/or they contain water. When these products are applied to solid fertilizer granules, they quickly dissolve the surface granules leaving most subsurface granules untouched. In many cases, the solid fertilizers applied with a coating of an aqueous solution/dispersion can form agglomerations clogging field application equipment making it difficult to ensure an even distribution of fertilizer on fields. If these granules of fertilizer have also been coated with a moisture-sensitive urease inhibitor like an alkyl thiophosphoric triamide, the presence of moisture from water based products will result in degradation of these important urease inhibitors, negatively impacting/limiting their performance. Some innovations have to be sold as a costly, separate application product because of the presence of water. The newer technologies utilize volatile organic solvents to promote quick drying, but utilizing this approach increases the volatility of organic compounds in the process such as by using a low flash point alcohol such as methanol. In some instances, this leads to the loss of additive, making the fertilizer additive more expensive. To address these problems, there is a need for a non-aqueous liquid formulation that can easily and evenly coat fertilizer granules without resulting in agglomeration. The non-aqueous liquid formulation should contain components that will liberate bound nutrients, be safe, have low moisture and be environmentally friendly while simultaneously providing more flexibility for fertilizer manufacturers to produce products designed for the particular soil requirements that occur in different regions of the world.

SUMMARY OF THE INVENTION

In an embodiment, the present invention relates to a series of organic solvent systems that dissolve poly (organic acids) and/or their salts and results in a product that can coat fertilizer granules evenly and economically and impart to the fertilizer the vital property of liberating bound nutrients when applied to the soil.

In embodiments, the present invention also relates to improved solvent formulations for Poly (organic acids) for application to man-made and/or natural organic based animal manure fertilizers. In a variation, poly (organic acids) may be solid chemical substances, which are dissolved in a suitable solvent to allow application at low levels in the field. Additionally, solutions of poly (organic acids) may be desirable when they are to be incorporated as components of a granular mixed fertilizer, such that they can be deposited as a coating in a controlled and homogenous layer. In one embodiment, this invention proposes formulations of mixtures containing aprotic and/or protic solvents, which are more environmentally friendly and are safe for manufacturers, transporters and others who work with/handle the compositions/formulations.

In one embodiment, improved delivery formulations have been developed that deliver effective levels of poly (organic acids) and/or their salts that liberate nutrients bound in the soil as insoluble salts and complexes over time increasing their longevity in the soil. It has been found that the delivery formulations of the present invention provide a liquid vehicle to deliver an even, non-clumping application of the desired poly (organic acids) and/or their salts to the fertilizer granule. These new delivery formulations for poly (organic acids) and/or their salts are non-water-containing organic solvents that improve the storage life of fertilizers containing urease inhibitors such as alkyl thiophosphoric triamides relative to those formulations containing greater than 1% water. In fact, because of the present invention, one can now combine poly (organic acids) and/or their salts to liberate bound nutrients, nitrification inhibitors, and crease inhibitors in one product by either blending together the dispersions of each or by combining the dispersions of both inhibitors in the same improved solvent formulation(s). In embodiments, the present invention relates to compositions/formulations of poly (organic acids) and/or their salts in organic solvent based solvating systems that:

Are environmentally safe;

Have flashpoints above 145° F.;

Are inherently rated safe for contact with humans and animals;

Provide stable solutions of poly (organic acids) or their salts at 1-50% in solution to storage temperatures down to at least 10° C.;

Provide improved even application to fertilizer granules while not causing clumping of the granules;

Will not detrimentally impact the stability of alkyl thiophosphoric triamides.

In one embodiment, it has been discovered that while various organic solvents might meet some of the above criteria, the delivery system of the present invention can be optimized to provide a formulation with a high concentration of poly (organic acids) and/or their salts while maintaining a low chill point by combining two or more organic solvents in a solvating system. In one embodiment, one process for preparing the formulations of the present invention is to heat the combined solvents to temperatures approaching about 100° C. and charging the poly (organic acids) and/or their salts in a combined level of 10-60% of the total formula composition, which can be dissolved in the solvent mixture with moderate agitation.

In one embodiment, the present invention relates to an effective solvent combination that comprises dimethyl sulfoxide (DMSO), which, can be used in combination with another organic-solvent delivery system that has a low chill point and good solvating properties. Besides the advantages listed above, DMSO also has the advantage of potentially serving as a source of the important nutrient sulfur.

DETAILED DESCRIPTION

Improved delivery formulations have been developed that deliver effective levels of poly (organic acids) and/or their salts that liberate nutrients bound in the soil as insoluble salts and complexes. These delivery formulations not only provide a liquid vehicle to deliver an even, non-clumping application of the desired poly (organic acids) and/or their salts to the fertilizer granule, but it has been discovered that formulations based on non-aqueous solvating systems improve the storage life of the important urease inhibitors, such as alkyl thiophosphoric triamides. Alkyl thiophosphoric triamides, if present in combination with poly (organic acids) and/or their salts as contained in the present formulations, have been shown to be extremely effective urease inhibitors but suffer from degradation upon storage if exposed to moisture contained in these current technologies. Thus, in one embodiment the present invention relates to compositions that are substantially free of water.

The delivery system of the present invention is based on (an) improved solvent formulation(s) that is used to solubilize one or more poly (organic acid) and/or its salts and can contain one or more of the following:

Urease inhibitor(s);

Nitrification inhibitor(s);

Additives such as but not limited to surfactants, buffers, fragrance/odor masking agents, colorants, micro-nutrients, and/or flow modifiers such as silica.

In one embodiment, the compositions of the present invention contain one or more poly (organic acid(s)) and/or its salts, one or more nitrification inhibitor(s) and one or more urease inhibitor(s). These compositions optionally contain one or more of surfactants, buffers, fragrance/odor masking agents, colorants, micro-nutrients, and/or flow modifiers.

In one embodiment, the improved solvent formulations of the present invention meet one or more of the following criteria: They are:

environmentally safe;

thermally safe because they have flashpoints above 145° F.;

inherently rated safe for contact with humans and animals;

able to maintain poly(organic acids) and/or their salts at levels of 1-50% in solution to temperatures down to at least 10° C. This ability means that these compositions have relatively long storage lives;

able to provide improved and even application to fertilizer granules of poly(organic acids) and or their salts while not causing clumping of the granules;

substantially free of water which also provides improved stability of urease inhibitors, primarily alkyl thiophosphoramides such as N-(n-butyl) thiophosphoric triamide (NBPT).

In one embodiment, the present invention relates to liquid formulations containing sodium polyaspartate (polymer weight=1,500 to 3000 or alternatively about 1500-2750 or alternatively 1750-2500 or alternatively about 2000-2250). In an embodiment, the formulations can be made by dissolving the sodium polyaspartate into a a) protic solvent consisting of 1) an alcohol or polyol from the family of alkylene and poly(alkylene) glycols. Exemplary compounds that can be used include ethylene glycol, 1,3 propylene glycol, 1,2 propylene glycol, butylene glycol, trimethylol propane trimethylol ethane, pentaerythritol, sorbitol and sorbitan, glucose, fructose, galactose, isopropylidene glycerol and/or glycerin and/or 2) alkylene glycol alkyl ethers such as tripropylene glycol methyl ether, tripropylene glycol butyl ether, b) mixed with aprotic component(s) such as 1) Dimethyl Sulfoxide and or 2) dialkyl, diaryl, or alkylaryl sulfoxide(s) having the formula

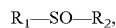

$R_1$—SO—$R_2$, wherein $R_1$ is methyl, ethyl, n-propyl, phenyl or benzyl and wherein $R_2$ is ethyl, n-propyl, phenyl or benzyl and/or 3) alkylene carbonates such as ethylene carbonate, propylene carbonate and/or butylene carbonate and/or 4) polyols capped with acetate or formate wherein the polyol portion may be one or more of ethylene glycol, 1,3 propylene glycol, 1,2 propylene glycol, butylene glycol, trimethylol, propane trimethylol ethane, pentaerythritol, sorbitol and sorbitan, glucose, fructose, galactose and/or glycerin 4) alkylene glycol alkyl ethers acetates such as tripropylene glycol methyl ether acetate, tripropylene glycol butyl ether acetate and/or 5) isophorone 6) ethyl, propyl, or butyl lactate 7) dimethylsuccinate, dimethyl adipate, diethyl glutarate, and/or dimethyl glutarate.

Additionally, the delivery formulations of the present invention may contain one or more of the following:

a food coloring or dye that may be used to improve the visual evidence of complete coverage and serve as a visual marker;

scents or masking agents to improve the odor of the formulations;

nonionic, anionic, cationic, zwitterionic, and/or amphoteric surfactants to improve formula application performance of fertilizer granules;

buffering agents one or more urease inhibitors in an organic liquid dispersing system; and/or one or more nitrification inhibitors in an organic liquid dispersing system;

In one embodiment, the solvating system of the present invention is an organic solvent or a blend of organic solvents, which may include but are not limited to one or more of the following:

dimethyl sulfoxide, dimethylacetamide, dimethylformamide hexamethylphosphoramide, propylene carbonate, ethylene carbonate, butylene carbonate, 1,2-dimethyloxethane, 2-methoxyethyl ether, cyclohexylpyrrolidone, ethyl lactate, 1,3 dimethyl-2-imidazolidinone, limonene, acetate and/or fumerate capped polyols, and include but are not limited to the following polyols, alcohols or esters:

ethylene glycol, propylene glycol, butylene glycol, trimethylol propane, pentaerythritol, glycerine, isopropylidene glycerol, trimethylol ethane, polyethylene glycol, polypropylene glycol, polyethylene/polypropylene glycol copolymer, tripropylene glycol methyl ether, tripropylene glycol butyl ether, propylene carbonate, isophorone, dimethylsuccinate, dimethyl adipate, diethyl glutarate, dimethyl glutarate.

Additionally, the delivery formulation(s) may contain the following:

a food coloring or dye that may be used to improve the visual evidence of complete coverage and serve as a visual marker scents or masking agents to improve the odor of the formula nonionic, anionic, cationic, zwitterionic, and/or amphoteric surfactants to improve formula application performance of fertilizer granules buffering agents In an embodiment, the formulation may contain one or more poly (organic acids) and/or their salts based on the following monomers either as homopolymers, copolymers and/or terpolymers at effective levels in the delivery system wherein they may be present in an amount between about 5-50% of the total amount.

aspartic acid
glutamic acid
maleic anhydride
itaconic anhydride
citraconic anhydride
citric acid
acrylic acid In an embodiment, NBPT is added to an 80/20 to 20/80 mix of dimethyl sulfoxide (DMSO) and ethylene glycol and subsequently polyaspartic acid (or its salt or ester) is added with the polyaspartate being about 5-45% by weight of the total composition. In an embodiment, polyaspartate is added, under agitation, to the combined solvents that have been heated in a mixing vessel at a desired temperature of about 0° C. to 150° C., or alternatively at a temperature of about 10° C. to 120° C. or alternatively, at a temperature of about 20° C. to 100° C., or alternatively between about 50° C. and 100° C. and mixed until the poly aspartate acid is completely dissolved. The heated mix vessel, in this embodiment, may be jacketed and the temperature carefully controlled. In an embodiment, the mixing action should allow complete mixing without too much aeration. In a variation, the heating may be accomplished using hot water or low pressure steam to control any hot spots on walls of the vessel to prevent heat degradation. At this stage, the mixture can be cooled to about 35° C. and then the NBPT can be added and agitated until completely dissolved. The mixture can be cooled to 25° C. or below and one or more of the following may be added, if desired:

a food coloring or dye that improves the visual evidence of complete coverage and serves as a visual marker scents or masking agents that improve the odor of the formula nonionic, anionic, cationic, zwitterionic, and/or amphoteric surfactants to improve formula application performance on insuring even distribution and of fertilizer granules in the soil: and/or buffering agents.

It should be recognized that in the temperature ranges given above, the ranges are set so as to allow adequate dissolution of the various compounds. The inventors recognize that should a compound be added that has temperature stability issues, the additions may be under reduced pressure conditions so as to prevent temperature sensitive degradations of the one or more compounds but at the same time allowing their dissolution in the organic solvent.

In another embodiment, poly aspartate ammonia salt may be present at a 10-50% level in a solution mix of DMSO and ethylene glycol at a ratio of about 80/20 to 20/80. In this embodiment, poly aspartate ammonia salt may be added, under agitation, to the combined aprotic solvents that have been heated in a mixing vessel at a desired temperature of about 0° C. to 60° C., or alternatively, at a temperature of about 10° C. to 50° C. and, alternatively, to a temperature of about 20° C. to 40° C. and mixed until the poly aspartate ammonia salt is completely dissolved. Also in this embodiment, the heated mix vessel may be jacketed and temperature controlled. In an embodiment, the mixing action may allow complete mixing without too much aeration. In an embodiment the mixing action might include one or more of high shear devices such as a cowles blade, a colloid mill, a rotor stator and/or a ball mill. The heating may be accomplished using hot water and/or low pressure steam to control any hot spots on the walls of the vessel, which can prevent heat degradation. At this stage, the mixture can be cooled to about 25° C. or below, and one or more of the following additives may be added, if desired:

a food coloring or dye may be used to improve the visual evidence of complete coverage and serve as a visual marker;

scents or masking agents to improve the odor of the formula;

nonionic, anionic, cationic, zwitterionic, and/or amphoteric surfactants to improve formula application performance of fertilizer granules; and/or buffering agents.

In an embodiment, poly aspartate or its acid may be added at a 5-50% level relative to a composition comprising ethylene glycol. In this embodiment, poly aspartate acid may be added, under agitation, to the solvents that have been heated in a mixing vessel at a temperature of about 0° C. to 60° C. and mixed until the poly aspartate is completely dissolved. In an embodiment, the heated mix vessel may be jacketed and the temperature controlled. In a variation, the mixing action allows complete mixing without too much aeration. The heating can be accomplished using hot water and/or low pressure steam to control any hot spots on the walls of the vessel to prevent heat degradation. At this stage, the mixture may be cooled to 25° C. or below and one or more of the following may be added, if desired:

a food coloring or dye may be used to improve the visual evidence of complete coverage and serve as a visual marker;

scents or masking agents to improve the odor of the formula;

nonionic, anionic, cationic, zwitterionic, and/or amphoteric surfactants to improve formula application performance of fertilizer granules; and/or
buffering agents In an embodiment, poly aspartate ammonia salt may be incorporated at a 5-50% level to ethylene glycol. In this embodiment, poly aspartate ammonia may be added, under agitation, to the combined aprotic solvents that have been heated in a mixing vessel at a temperature of about 0° C. to 60° C. and mixed until the polyaspartate ammonia salts are completely dissolved. The heated mix vessel may be jacketed and the temperature controlled. In a variation, the mixing action allows complete mixing without too much aeration. The heating can be accomplished using hot water or low pressure steam to control any hot spots on the walls of the vessel to prevent heat degradation. At this stage, the mixture may be cooled to 25° C. or below and one or more of the following may be added, if desired:

a food coloring or dye may be used to improve the visual evidence of complete coverage and serve as a visual marker;
 scents or masking agents to improve the odor of the formula;
 nonionic, anionic, cationic, zwitterionic, and/or amphoteric surfactants to improve formula application performance of fertilizer granules; and/or buffering agents In an embodiment, polymaleic anhydride may be produced in a solvent such as xylene using an organic peroxide using a process known to those of skill in the art. The resulting solvated poly (organic acid) can undergo solvent replacement by charging an aprotic solvent such as 1) dimethyl sulfoxide and/or 2) a dialkyl, diaryl, or alkylaryl sulfoxide having the formula

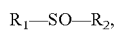

wherein $R_1$ is methyl, ethyl, n-propyl, phenyl or benzyl and
wherein $R_2$ is ethyl, n-propyl, phenyl or benzyl
and/or 3) alkylene carbonate such as ethylene carbonate, propylene carbonate and/or butylene carbonate and/or 4) polyol capped with acetate or formate with the polyol portion comprised of ethylene glycol, 1,3 propylene glycol, 1,2 propylene glycol, butylene glycol, trimethylol, propane trimethylol ethane, pentaerythritol, sorbitol and sorbitan, glucose, fructose, galactose and/or glycerin 4) alkylene glycol alkyl ethers acetates such as tripropylene glycol methyl ether acetate.

One may then begin to strip the unwanted solvent out either by differential boiling points or by the use of a vacuum (such as by use of a rotary evaporator) until the unwanted solvent is reduced to a level that is less than about 1%. The polymaleic anhydride can be neutralized in the new solvating system to a desired pH with NaOH, KOH, $NH_3$, $K_3$, $K_2CO_3$, $Na_2CO_3$, $KHCO_3$ and/or $NaHCO_3$. If water resulting from neutralization or from the addition of aqueous solutions of these alkalis is present, the water can be removed by stripping (such as by use of a rotary evaporator) through temperature or through lower temperature/vacuum to ensure a low moisture formula.

Other known means of removing water can be used such as by use of molecular sieves or by addition of a drying agent (such as $Na_2SO_4$ or $MgSO_4$) and subsequent filtration.

In an embodiment, potassium polyaspartate can be incorporated in amounts that are about 10-45% of a formulation mixture that also contains ethylene and propylene glycol at ratios from about 80/20 to 20/80. In an embodiment, potassium polyaspartate may be added, under agitation, to the combined organic liquids that have been heated in a mixing vessel at a temperature of about 0° C. to 150° C., or alternatively to a temperature of about 40° C. to 130° C., or alternatively to a temperature of about 60° C. to 120° C., or alternatively to a temperature of about 70° C. to 100° C. and mixed until the potassium polyaspartate is completely dissolved. In an embodiment, the heated mix vessel may be jacketed and the temperature carefully controlled. In a variation, the mixing action allows complete mixing without too much aeration. Heating can be accomplished using hot water or low pressure stream to control any hot spots on the walls of the vessel to prevent heat degradation to the potassium polyaspartate. Alternatively, the mixing may be done at reduced pressure or the action can be performed in an inert atmosphere (such as but not limited to nitrogen, argon and/or carbon dioxide) to limit thermal or oxidative degradation. At this stage (after the initial mixing), the mixture may be cooled to about 25° C. or below and one or more of the following may be added, if desired:

one or more urease inhibitors dispersed in an organic liquid dispersing system;
 one or more nitrification inhibitors dispersed in an organic liquid dispersing system;
 a food coloring or dye to improve the visual evidence of complete coverage and serve as a visual marker;
 scents or masking agents to improve the odor of the formula;
 nonionic, anionic, cationic, zwitterionic, and/or amphoteric surfactants to improve formula application performance of fertilizer granules; and/or
 buffering agents.

In another variation, the mixture of poly (organic acid)(s) in an organic-liquid can be placed under high shear agitation such as but not limited to an overhead agitator equipped with a cowles blade or a rotor stator mixer to assist in reducing viscosity of the mixture.

In an embodiment, the present invention relates to making the compositions and fertilizer granules and liquid additives of the present invention. In a variation a polysuccinimide is heated to 100-160° C. in the presence of an excess of a protic solvent resulting in the formation of a polyaspartate-ester dispersed in the protic solvent which is subsequently saponified with the addition of NaOH, KOH, $NH_3$, $K_2CO_3$, $Na_2CO_3$, $KHCO_3$ and $NaHCO_3$ resulting in a stable dispersion of a salt of polyaspartic acid in an organic-liquid.

In an embodiment, the present invention relates to making the compositions and fertilizer granules and liquid additives of the present invention. In a variation a polysuccinimide is heated to 40-80° C. in the presence of an aprotic solvent and mixed until the polysuccinimide is completely dissolved. NaOH, KOH, $NH_3$, $K_2CO_3$, $Na_2CO_3$, $KHCO_3$ or $NaHCO_3$ are charged and mixed. The vessel is placed under vacuum to remove any residual water formed or introduced.

In an embodiment, the present invention relates to making the compositions and fertilizer granules and liquid additives of the present invention. In a variation a reactive monomer or a blend of reactive monomers such as but not limited to aspartic acid and/or glutamic acid is heated to 100-185° C. in the presence of an excess of protic solvent resulting in the formation of a poly (organic-ester) which is subsequently saponified with the addition of NaOH, KOH, $NH_3$, $K_2CO_3$, $Na_2CO_3$, $KHCO_3$ or $NaHCO_3$ resulting in a stable dispersion of a salt of poly (organic acid) in an organic-liquid.

In an embodiment, the present invention relates to making the compositions and fertilizer granules and liquid additives of the present invention. In a variation a reactive monomer or a blend of reactive monomers such as but not limited to acrylic acid, maleic anhydride, maleic acid, citraconic anhydride itaconic anhydride and/or itaconic acid glutamic acid is heated to 60-140° C. in the presence of excess protic solvent and with a free radical catalyst such as but not limited to ammonium persulfate, benzoyl peroxide and/or di-tort butyl peroxide resulting in the formation of a poly (organic-ester) which is subsequently saponified with the addition of NaOH, KOH, NH$_3$, K$_2$CO$_3$, Na$_2$CO$_3$, KHCO$_3$ or NaHCO$_3$ resulting in a stable dispersion of a salt of poly (organic acid(s)) in an organic-liquid.

In an embodiment, polyacrylic acid may be produced in a solvent such as methyl ethyl ketone using a peroxide catalyst and a process known to those experienced in the art. The resulting solvated poly (organic acid) can undergo solvent replacement by charging an aprotic solvent from the group comprised of 1) dimethyl sulfoxide and/or 2) dialkyl, diaryl, or alkylaryl sulfoxide having the formula

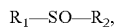

wherein R$_1$ is methyl, ethyl, n-propyl, phenyl or benzyl and wherein R$_2$ is ethyl, n-propyl, phenyl or benzyl and/or 3) alkylene carbonate such as ethylene carbonate, propylene carbonate and/or butylene carbonate and/or 4) a polyol capped with acetate or formate with the polyol portion being one or more of ethylene glycol, 1,3 propylene glycol, 1,2 propylene glycol, butylene glycol, trimethylol, propane trimethylol ethane, pentaerythritol, sorbitol and sorbitan, glucose, fructose, galactose and/or glycerin 4) alkylene glycol alkyl ethers acetates such as tripropylene glycol methyl ether acetate.

Subsequently, one can then begin to strip the unwanted solvent out either by differential boiling points or by the use of vacuum until the unwanted solvent is reduced to a level that is less than about 1%. The polyacrylic acid can be neutralized in the new solvating system to a desired pH with NaOH, KOH, NH$_3$, K$_2$CO$_3$, Na$_2$CO$_3$, KHCO$_3$ and NaHCO$_3$. If water resulting from neutralization or from the addition of aqueous solutions of these alkalis is present, the water can be removed by stripping (such as by use of a rotary evaporator) through temperature or through lower temperature/vacuum to ensure a low moisture formula.

In an embodiment, one or more additional urease inhibitors, one or more additional poly (organic acids) and/or one or more additional nitrification inhibitors may be added to formulations of the present invention. In an embodiment, the additional urease inhibitor, poly (organic acids) and/or nitrification inhibitors may be dissolved in the mixture. In an embodiment, useful mixtures may be prepared either by dilution or mixture with liquid fertilizers.

Examples of the present formulation include liquid mixtures of urea or solid mixtures that may be made by contacting the mixture with solid fertilizers such as granular urea. In an embodiment, coated granular urea can be prepared by using any commercially available equipment in which granular product can be mixed or sprayed with a liquid. A flow aid, silicas or surfactants such as soap or nonionic surfactants may be added prior to addition of the liquid for improved dispersability.

The resulting product(s) can be applied to soil in either a liquid and/or a granular form to provide improved nutrient retention in the soil for uptake for plant life.

In an embodiment, the one or more nitrification inhibitors comprises dicyanoamides, one or more of the poly (organic acids) polyaspartic acid and/or its salts, and the one or more urease inhibitors comprises phosphoramides.

In an embodiment, the composition may comprise one or more of surfactants, buffers, fragrance/odor masking agents, colorants, micro-nutrients, and/or flow modifiers.

In an embodiment, the composition is substantially free of water.

In an embodiment, the present invention relates to fertilizer additives. In one embodiment, the fertilizer additive comprises one or more nitrification inhibitors, one or more poly (organic acids) and one or more urease, inhibitors.

In an embodiment, the present invention relates to making compositions and fertilizer additives. In one embodiment, the present invention relates to a method of making a composition to be added to a fertilizer, wherein the method comprises:

heating a mixture comprising one or more poly (organic acid);

cooling the mixture to a temperature that optionally allows addition of one or more of surfactants, buffers, fragrance/odor masking agents, colorants, micro-nutrients, and/or flow modifiers.

In one variation of the method, the method comprises further adding the composition to a fertilizer.

In an embodiment, the present invention relates to a composition comprising one or more poly (organic acids) and/or their salts in an organic liquid solvating system comprising one or more protic solvents;

wherein the one or more protic solvent(s) comprise one or more of 1) an alcohol or polyol from the family of C$_{1-10}$ alkanols and poly(C$_{1-10}$ alkylene) glycols, 2) an alkylene glycol selected from the group consisting of ethylene, propylene, and butylene glycol, 3) glycerin, isopropylidene glycerol, trimethylol propane, triethanol propane, pentaerythritol 4) an alkanolamine selected from the group consisting of ethanolamine, diethanolamine, dipropanolamine, methyl diethanolamine, monoisopropanolamine and triethanolamine, 5) alkylene glycol alkyl ethers selected from the group consisting of tripropylene glycol methyl ether, and tripropylene glycol butyl ether wherein the one or more polyorganic acids and/or their salts is a monomer homopolymer, a copolymer and/or a terpolymer or one or more of the following:

aspartic acid
glutamic acid
maleic anhydride
itaconic anhydride
citraconic anhydride
citric acid; or
acrylic acid;

wherein the polyorganic acids are present in an amount that is about 5-50% of the total composition.

In a variation, the composition may contain one or more protic solvents that comprise ethylene glycol, propylene glycol, butylene glycol, glycerine, tripropylene glycol and/or their methyl ethers.

In a variation, the one or more protic solvents comprise between about 90/10 to 10/90% of the composition.

In a variation, the one or more polyorganic acids is potassium aspartate in a formulation wherein potassium aspartate is present in an amount that is between about 10-45% of a total formulation amount and the formulation also contains a mixture of ethylene glycol and propylene glycol in ratios that are between about 20/80 to 80/20.

In an embodiment, the composition may further comprise one or more of surfactants, buffers, fragrance/odor masking agents, colorants, micro-nutrients, dispersed urease inhibitor(s) dispersed nitrification inhibitor(s) and/or flow modifiers.

In a variation, the composition is substantially free of water.

In an embodiment, the present invention relates to a composition comprising one or more polyorganic acids and/or their salts in an organic liquid solvating system comprising a mixture of aprotic and protic solvents
wherein the aprotic solvents is/are
1) dimethyl sulfoxide,
2) dialkyl sulfoxide, diaryl sulfoxide, or an alkylaryl sulfoxide having the formula

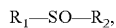

wherein $R_1$ is methyl, ethyl, n-propyl, phenyl or benzyl and $R_2$ is ethyl, n-propyl, phenyl or benzyl,
3) alkyl carbonate selected from the group consisting ethylene, propylene and butylene carbonates,
4) ethyl, propyl, or butyl lactate
5) isophorone and/or dimethylsuccinate, diethyl glutamate, dimethyl adipate, dimethyl glutarate and the protic component(s) is/are one or more of a) an alcohol or polyol selected from the group consisting of $C_{1-10}$ alkanols and poly($C_{1-10}$ alkylene) glycols, b) an alkylene glycol selected from the group consisting of ethylene, propylene, and butylene glycol, c) glycerin, isopropylidene glycerol d) an alkanolamine selected from the group consisting of ethanolamine, diethanolamine, dipropanolamine, methyl diethanolamine, monoisopropanolamine and triethanolamine, e) alkylene glycol alkyl ethers selected from the group consisting of tripropylene glycol methyl ether, and tripropylene glycol butyl ether.

In a variation, the composition may contain one or more polyorganic acids and/or their salts and the polyorganic acids and/or their salts are a monomer, a homopolymer, a copolymer and/or a terpolymer comprising one or more of
aspartic acid
glutamic acid
maleic anhydride
itaconic anhydride
citraconic anhydride
citric acid; or
acrylic acid
wherein the one or more polyorganic acids are present at about 5-50% of a total composition.

In an embodiment, the composition may contain (a) protic solvent(s) that is(are) ethylene glycol, propylene glycol, butylene glycol, glycerine, tripropylene glycol methyl ether In a variation, the aprotic solvent(s) is(are) dimethyl sulfoxide, propylene carbonate, dimethylsuccinate, diethyl glutarate, or dimethyl glutarate.

In a variation, the ratio of protic solvent to aprotic solvent is between about 90/10 to 10/90% and a total of the organic liquid solvating system is between about 10 to 90% of a final composition.

In a variation, the one or more polyorganic acids and their salts comprise sodium aspartate in a formulation wherein sodium aspartate is present in an amount that is between about 10-45% of a total formulation amount and the formulation also contains a) ethylene glycol and/or propylene glycol and b) propylene carbonate in a ratio that is between about 20/80 to 80/20.

In a variation, the composition is substantially free of water.

In an embodiment, the present invention relates to a fertilizer additive, which comprises one or more polyorganic acids and/or their salts in an organic liquid solvating system comprising one or more protic solvents or a mixture of aprotic and protic solvents,
wherein the aprotic solvent is 1) dimethyl sulfoxide, 2) a dialkyl sulfoxide, diaryl sulfoxide, or an alkylaryl sulfoxide having the formula

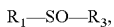

wherein $R_1$ is methyl, ethyl, n-propyl, phenyl or benzyl, and $R_2$ is ethyl, n-propyl, phenyl or benzyl,
3) an alkyl carbonate selected from the group consisting of ethylene, propylene and butylene carbonates, 4) ethyl, propyl, or butyl lactate 5) isophorone and/or dimethylsuccinate, dimethyl adipate, diethyl glutarate, dimethyl glutarate, and the protic component(s) is/are one or more of 1) an alcohol or polyol from the family of $C_{1-10}$ alkanols and poly($C_{1-10}$ alkylene) glycols, 2) an alkylene glycol selected from the group consisting of ethylene, propylene, and butylene glycol, 3) glycerin, isopropylidene glycerol, 4) an alkanolamine selected from the group consisting of ethanolamine, diethanolamine, dipropanolamine, methyl diethanolamine, monoisopropanolamine and triethanolamine, and/or 5) alkylene glycol alkyl ethers selected from the group consisting of tripropylene glycol methyl ether, and tripropylene glycol butyl ether.

In a variation, the fertilizer may comprise one or more polyorganic acids and/or their salts, which are a monomer, a homopolymer, a copolymer or a terpolymer of one or more of the following:
Aspartic acid
Glutamic acid
Maleic Anhydride
Itaconic Anhydride
Citraconic anhydride
Citric acid
Acrylic acid;
wherein the one or more polyorganic acids is present at an amount that is about 5-50% of a total composition.

In a variation, the fertilizer additive may further comprising one or more nitrification inhibitors wherein the one or more nitrification inhibitors is selected from the group consisting of 2-chloro-6-trichloromethyl)pyridine, 4-amino-1,2,4-6-triazole-HCl, 2,4-diamino-6-trichloromethyltriazine CL-1580, dicyandiamide, thiourea, 1-mercapto-1,2,4-triazole, 3,4-dimethylpyrazole phosphate, and 2-amino-4-chloro-6-methylpyrimidine.

In an embodiment, the fertilizer additive may further comprise one or more urease inhibitors wherein the one or more urease inhibitors is selected from the group consisting of phosphoric triamides, thiophosphoric triamides and alkylated thiophosphoric triamides, wherein the alkylated thiophosphoric triamides has one or more alkyl groups that independently contain between 1 and 6 carbon atoms.

In a variation, the fertilizer additive may comprise one or more nitrification inhibitors wherein the one or more nitrification inhibitors comprise dicyanoamide, the one or more polyorganic acids comprise polyaspartic acid and the one or more urease inhibitors comprise phosphoric triamides. Alternatively, the one or more urease inhibitors may comprise a phosphoramide.

In an embodiment, the present invention relates to a method of making a composition to be added to a fertilizer comprising:
heating a mixture comprising one or more polyorganic acids in an organic liquid solvating system comprising one or more protic solvents or comprising a mixture of aprotic and protic solvents wherein the aprotic solvent is 1) dimethyl sulfoxide, 2) dialkyl sulfoxide, diaryl sulfoxide, or an alkyl aryl sulfoxide having the formula $$R_1—SO—R_2,$$

wherein $R_1$ is methyl, ethyl, n-propyl, phenyl or benzyl and $R_2$ is ethyl, n-propyl, phenyl or benzyl, 3) an alkyl carbonate selected from the group consisting of ethylene, propylene and butylene carbonates, 4) an ethyl, propyl, or butyl lactate 5) an isophorone and/or dimethylsuccinate, dimethyl adipate, diethyl glutarate, dimethyl glutarate, and the protic component(s) is/are one or more of 1) an alcohol or polyol from the family of $C_{1-10}$ alkanols and poly($C_{1-10}$ alkylene) glycols, 2) an alkylene glycol selected from the group consisting of ethylene, propylene, and butylene glycol, 3) glycerin, isopropylidene glycerol, 4) an alkanolamine selected from the group consisting of ethanolamine, diethanolamine, dipropanolamine, methyl diethanolamine, monoisopropanolamine and triethanolamine and/or 5) alkylene glycol alkyl ethers selected from the group consisting of tripropylene glycol methyl ether, and tripropylene glycol butyl ether;

and cooling the mixture to a temperature that optionally allows addition of one or more of surfactants, buffers, fragrance/odor masking agents, colorants, micro-nutrients, dispersed urease inhibitor(s), dispersed nitrification inhibitor(s) and/or flow modifiers.

In an embodiment, the method may further comprise adding the composition to a fertilizer.

In a variation, the method may comprise one or more polyorganic acids and/or their salts wherein they are a homopolymer, a copolymer, or a terpolymer comprising one or more of the following:

Aspartic acid
Glutamic acid
Maleic Anhydride
itaconic Anhydride
Citraconic anhydride
Citric acid
Acrylic acid;

wherein the one or more polyorganic acids are present at a level that is between about 5-50% of a total composition.

In a variation, the method may use dispersed nitrification inhibitors that is/are one or more members selected from the group consisting of 2-chloro-6-trichloromethyl)pyridine, 4-amino-1,2,4-6-triazole-HCl, 2,4-diamino-6-trichloromethyltriazine CL-1580, dicyandiamide, thiourea, 1-mercapto-1,2,4-triazole, and 2-amino-4-chloro-6-methylpyrimidine, 3,4-dimethylpyrazole phosphate.

In an embodiment, the method may comprise one or more dispersed urease inhibitors wherein they are one or more members selected from the group consisting of phosphoric triamides, thiophosphoric triamides and alkylated thiophosphoric triamides, wherein the alkylated thiophosphoric triamides has one or more alkyl groups that independently contain between 1 and 6 carbon atoms.

In a variation, the method may comprise a dispersed nitrification inhibitor and a dispersed urease inhibitor wherein the dispersed nitrification inhibitor comprises dicyanoamide and the dispersed urease inhibitor comprises phosphoric triamides. Alternatively, the dispersed urease inhibitor may comprise a phosphoramide.

In a variation, the method may use a composition that is substantially free of water. Substantially free of water means less than about 1% water.

The following Examples are presented to illustrate certain embodiments of the present invention:

Example 1

400 grams of ethylene glycol was charged to a vessel, placed under strong agitation and then heated to 60° C. 222.2 grams of polyaspartate-potassium salt/90% NVS was then slowly charged to the vessel and mixed until completely dissolved. Once dissolved, the mixture was placed under high shear agitation by using an overhead mixer equipped with a cowles blade while maintaining the batch temperature at 60-80° C. for 1 hour. After one hour the vessel was sealed and a vacuum of 200 mm or less was pulled to remove water. The mixture was cooled to <30° C. and then packaged off in an appropriate container.

Example 2

120 grams of Example 1 was heated to 60° C., placed under agitation and then 80 grams of propylene glycol was charged to the vessel. The combination was mixed for 30 minutes and then cooled to <40° C. and packaged off.

Example 3

120 grams of Example 1 were heated to 60° C., placed under agitation and then 80 grams of glycerin were charged to the vessel. The combination was mixed for 30 minutes and then cooled to <40° C. and packaged off.

Example 4

120 grams of Example 1 were heated to 60° C., placed under agitation and then 40 grams of ethylene glycol and 40 grams of tripropylene glycol monomethyl ether were charged to the vessel. The combination was mixed for 30 minutes and then cooled to <40° C. and packaged off.

Example 5

450 grams of ethylene glycol was charged to a vessel, placed under strong agitation and then heated to 60° C. 300 grams of a polysuccinimide (5000 average molecular weight) was then slowly charged to the vessel and mixed until completely dispersed. The mixture was then heated to 140° C. and held until all particles dissolved (~1.5 hrs). The mix was then cooled to 50° C. 147 grams of KOH flakes were slowly charged to the mix at a rate to maintain temperature of 60-80° C. The formulation was mixed until all KOH flakes (100%) were dissolved. The mix was then cooled to 40° C. and then placed under high shear agitation by using an overhead mixer equipped with a cowles blade while maintaining the batch temperature at 60-80° C. for 1 hour. After one hour, an FTIR scan was run to determine if the presence of ester had been eliminated. The mixture was sampled every 30 minutes until traces of esters had been eliminated. The mixture was cooled to <30° C. and then packaged off in an appropriate container.

Example 6

58.54 grams of Example 5 were charged to a vessel and then placed under strong agitation and then heated to 60° C. 65.4 grams of ethylene glycol were then charged to the vessel and mixed for 30 minutes. After 30 minutes, the mixture was cooled to 38° C. and then packaged off in an appropriate container.

Example 7

58.54 grams of Example 5 were charged to a vessel and then placed under strong agitation and then heated to 60° C. 35.4 grams of ethylene glycol and 30 grams of dimethyl glutarate were then charged to the vessel and mixed for 30 minutes. After 30 minutes, the mixture was cooled to 38° C. and then packaged off in an appropriate container.

Example 8

58.54 grams of Example 5 were charged to a vessel and then placed under strong agitation and then heated to 60° C. 65.4 grams of glycerin were then charged to the vessel and mixed for 30 minutes. After 30 minutes, the mixture was cooled to 38° C. and then packaged off in an appropriate container.

Example 9

104.3 grams of Example 5 were charged to a vessel and then placed under strong agitation and then heated to 60° C. 45.7 grams of ethylene glycol were then charged to the vessel and mixed for 30 minutes. After 30 minutes, the mixture was cooled to 38° C. and then packaged off in an appropriate container.

Example 10

183.12 grams of dimethyl sulfoxide was charged to a vessel, placed under strong agitation and then heated to 60° C. 78.48 grams of a polysuccinimide (5000 average molecular weight) was then slowly charged to the vessel and mixed until completely dispersed. 72.34 grams of DI water was charged to the vessel and then 49.07 grams of NH4OH/28% were slowly charged holding the mixture's temperature at 60-80° C. It was mixed for one hour and then placed under a vacuum of 50 mm with a slight $N_2$ sparge until distillation ceases. The mix was then cooled to 40° C. and then packaged off in an appropriate container.

Example 11

282.52 grams of dimethyl sulfoxide was charged to a vessel, placed under strong agitation and then heated to 60° C. 146.23 grams of a partial sodium hydroxide neutralized polyacrylic acid (Kemira 5847) was then charged to the vessel and mixed for 15 minutes. A vacuum of 38 mm was applied until distillation ceases. The mix was then cooled to 40° C. and then packaged off in an appropriate container.

Example 12

250 grams of ethylene glycol, 250 grams of L-aspartic acid and 2.94 grams of phosphoric acid/85% were charged to a vessel, then placed under strong agitation and then heated to 175° C. After 5 hrs. 64.3 grams of distillate were collected and the batch was cooled to 60° C. 97.44 grams KOH flake (100%) was then slowly charged to the vessel at a rate that allowed the batch temperature to be 60-80° C. and mixed until completely dissolved. It was then placed under high shear agitation by using an overhead mixer equipped with a cowles blade while maintaining the batch temperature at 60-80° C. for 1 hour. After one hour, an FTIR scan was run to determine if the presence of ester had been eliminated. The mixture was sampled every 30 minutes until traces of esters had been eliminated. After the ester peak was eliminated, 281.08 grams of ethylene glycol were charged and the resulting mixture was mixed for 30 minutes. The mix was then cooled to 40° C. and then packaged off in an appropriate container.

Example 13

71.58 grams of acetone was charged to a vessel and then 12.48 grams of maleic anhydride and 16.49 grams itaconic anhydride and 0.98 grams of benzoyl peroxide were charged to the vessel. Very slow agitation was used until the maleic briquettes were dissolved. The vessel was then sealed and inerted with $N_2$ and the batch was heated to 60° C. and held at 55-65° C. for five hours. After five hours, the batch was cooled to 35° C. and 43.45 grams of ethylene glycol was charged. A vacuum was then pulled on the vessel slowly decreasing the pressure based on the distillation rate while heating the batch back to 55-65° C. When distillation ceases, the vacuum was broken with $N_2$ and then 15.39 grams of KOH flake (100%) were slowly charged in order to hold temperature at 60-80° C. When KOH flakes were completely dissolved, the mix was placed under high shear agitation by using an overhead mixer equipped with a cowles blade while maintaining the batch temperature at 60-80° C. for 1 hour. Thereafter the mix was checked using an FTIR scan. The FTIR scan was run and checked every 30 minutes for the disappearance of the ester peak. After the ester peak disappeared, 89.63 grams of ethylene glycol were charged, and the batch was then mixed 30 minutes and cooled to <40° C. and then off-loaded into the appropriate container.

Example 14

45 grams of Example 12 were mixed with 10 grams of N-Yield (an urease inhibitor in an organic liquid), 40 grams of N-Bound (a nitrification inhibitor in an organic liquid) and 5 grams of glycerin. The resulting fluid product was then off-loaded into the appropriate container.

The following references are incorporated by reference in their entireties.

|           |            |
|-----------|------------|
| 4,839,461 | Boehmke    |
| 4,172,072 | Ashmead    |
| 4,799,953 | Danzig     |
| 4,813,997 | Kinnersley |
| 4,863,506 | Young      |
| 5,059,241 | Young      |
| 5,047,078 | Gill       |
| 5,350,735 | Kinnersley |
| 5,593,947 | Kinnersley |
| 5,783,523 | Koskan     |
| 5,814,582 | Koskan     |
| 6,753,395 | Sanders    |
| 6,756,461 | Sanders    |
| 6,818,039 | Sanders    |
| 8,043,995 | Sanders    |
| 8,016,907 | Sanders    |
| 8,025,709 | Sanders    |

It is contemplated and therefore within the scope of the present invention that any feature that is described above can be combined with any other feature that is described above. When mixtures, formulations and/or compositions are discussed, it should be understood that those mixtures, formulations and/or compositions are contemplated as being parts of bigger mixtures, formulations and/or compositions. Further, if a composition is enumerated, methods using and methods of making that composition are contemplated and within the scope of the present invention. When a range is discussed, it is contemplated and therefore within the scope of the invention that any number that falls within that range is contemplated as an end point generating a plurality of sub-ranges within that range. For example if a range of 1-10 is given, 2, 3, 4, 5, 6, 7, 8, and 9 are contemplated as end points to generate a sub-range that fit within the scope of the enumerated range. Moreover, it should be understood that the present invention contemplates minor modifications that can be made to the compositions and methods of the present invention. In any event, the present invention is defined by the below claims.

We claim:

1. A composition comprising a) one or more polyorganic acids and/or their salts, b) organic liquid solvating system, c) one or more nitrification inhibitors and/or one or more urease inhibitors and d) one or more fertilizers selected from the group consisting of i) fertilizer solids and ii) liquid fertilizers, wherein the organic liquid solvating system and the one or more polyorganic acids and/or their salts are the delivery formulation for delivering the one or more polyorganic acids and/or their salts to fertilizer solids and/or liquid fertilizers, wherein the organic liquid solvating system comprises one or more members selected from the group consisting of i) protic solvents and ii) aprotic solvents, wherein the one or more protic solvents are selected from the group consisting of:
(i) one or more alcohols selected from the group consisting of $C_1$-$C_{10}$ alkanols,
(ii) one or more polyols selected from the group consisting of poly($C_1$-$C_{10}$ alkylene) glycols,
(iii) one or more alkylene glycols selected from the group consisting of ethylene, propylene, and butylene glycol,
(iv) one or more members selected from the group consisting of glycerin, trimethylol propane, triethanol propane, and pentaerythritol,
(v) one or more alkanolamines selected from the group consisting of: ethanolamine, diethanolamine, dipropanolamine, methyl diethanolamine, monoisopropanolamine and triethanolamine, and
(vi) one or more alkylene glycol alkyl ethers selected from the group consisting of tripropylene glycol methyl ether, and tripropylene glycol butyl ether,
wherein the one or more aprotic solvents are selected from the group consisting of
(i) dimethyl sulfoxide,
(ii) dialkyl sulfoxide, diaryl sulfoxide, and an alkylaryl sulfoxide having the formula

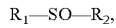

wherein: $R_1$ is methyl, ethyl, n-propyl, phenyl or benzyl and $R_2$ is ethyl, n-propyl, phenyl or benzyl,
(iii) one or more alkyl carbonates selected from the group consisting of ethylene, propylene and butylene carbonates,
(iv) one or more lactates selected from the group consisting of ethyl, propyl, and butyl lactate,
(v) isophorone,
(vi) one or more diesters selected from the group consisting of dimethylsuccinate, dimethyl adipate, diethyl glutarate, and dimethyl glutarate,
wherein the one or more nitrification inhibitors are selected from the group consisting of i) 2-chloro-6-trichloromethyl) pyridine, ii) 4-amino-1,2,4,6-triazole-HCl, iii) 2,4-diamino-6-trichloromethyltriazine CL-1580, iv) dicyandiamide, v) thiourea, vi) 1-mercapto-1,2,4-triazole, and vii) 2-amino-4-chloro-6-methylpyrimidine, wherein the one or more urease inhibitors are selected from the group consisting of i) phosphoric triamides, ii) thiophosphoric triamides, and iii) alkylated thiophosphoric triamides, wherein the alkylated thiophosphoric triamides have one or more alkyl groups that independently contain between 1 and 6 carbon atoms and wherein the delivery formulation comprises less than 1% water.

2. The composition of claim 1, wherein said composition is made by adding said one or more nitrification inhibitors and/or said one or more urease inhibitors to the one or more fertilizers, wherein the one or more nitrification inhibitors and/or the one or more urease inhibitors are dissolved into said organic liquid solvating system, b) optionally one or more dispersed nitrification inhibitors and/or dispersed urease inhibitors are added to the organic liquid solvating system and c) optionally one or more dispersed nitrification inhibitors and/or dispersed urease inhibitors are added to the one or more fertilizers.

3. The composition of claim 1, wherein the one or more urease inhibitors comprises N-(n-butyl) thiophosphoric triamide.

4. The composition of claim 1, wherein the composition further comprises the nitrification inhibitor 3,4-dimethylpyrazole phosphate.

5. The composition of claim 1, wherein the composition of the organic liquid solvating system further comprises the protic solvent isopropylidene glycerol.

6. The composition of claim 1, wherein said polyorganic acids and/or their salts comprise one or more members selected from the group consisting of a) monomer, b) homopolymer, c) a copolymer and d) a terpolymer wherein said polyorganic acids comprise one or more members selected from the group consisting of:
i) aspartic acid,
ii) glutamic acid,
iii) maleic anhydride,
iv) itaconic anhydride,
v) citraconic anhydride, and
vi) acrylic acid
wherein the salts of the polyorganic acids are a result of a reaction with one or more neutralizing compounds selected from the group consisting of: NaOH, KOH, $NH_3$, $K_2CO_3$ $Na_2CO_3$, $KHCO_3$ and $NaHCO_3$.

7. The composition of claim 1, wherein the organic liquid solvating system further comprises one or more members selected from the group consisting of: surfactants, buffers, fragrance/odor masking agents, colorants, micro-nutrients, drying agents, and flow modifiers.

8. The composition of claim 1, wherein said fertilizer solids comprise one or more members selected from the group consisting of a) urea, b) phosphate anion with one or more cations selected from the group consisting of i) calcium, ii) magnesium, iii) ammonium iv) manganese, v) zinc, and vi) iron, and c) manure and wherein said fertilizer solids comprise granules.

9. The composition of claim 1, wherein the composition of the delivery formulation further comprises the polyorganic acid citric acid and/or its salts.

10. The composition of claim 1, wherein the composition of said delivery formulation comprises 5-50% polyorganic acids and/or their salts.

11. A composition comprising a) one or more polyorganic acids and/or their salts, b) organic liquid solvating system, c) one or more inhibitors and d) one or more ureas selected from the group consisting of i) urea solids and ii) mixtures of liquid ureas, wherein the organic liquid solvating system and the one or more polyorganic acids and/or their salts are the delivery formulation for delivering the one or more polyorganic acids and/or their salts to the surface of said urea solids and/or to said mixtures of liquid ureas, wherein the organic liquid solvating system comprises one or more members from the group consisting of i) protic solvents and ii) aprotic solvents wherein the one or more protic solvents are selected from the group consisting of: one or more alcohols selected from the group consisting of:
(i) $C_1$-$C_{10}$alkanols,
(ii) one or more polyols selected from the group consisting of poly($C_1$-$C_{10}$ alkylene) glycols,
(iii) one or more alkylene glycols selected from the group consisting of ethylene, propylene, and butylene glycol,
(iv) one or more members selected from the group consisting of glycerin, trimethylol propane, triethanol propane, and pentaerythritol,
(v) one or more alkanolamines selected from the group consisting of: ethanolamine, diethanolamine, dipropanolamine, methyl diethanolamine, monoisopropanolamine and triethanolamine, and
(vi) one or more alkylene glycol alkyl ethers selected from the group consisting of tripropylene glycol methyl ether, and tripropylene glycol butyl ether,
wherein the one or more aprotic solvents are selected from the group consisting of
(i) dimethyl sulfoxide,
(ii) dialkyl sulfoxide, diaryl sulfoxide, and an alkylaryl sulfoxide having the formula

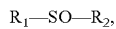

wherein: $R_1$ is methyl, ethyl, n-propyl, phenyl or benzyl and $R_2$ is ethyl, n-propyl, phenyl or benzyl,
(iii) one or more alkyl carbonates selected from the group consisting of ethylene, propylene and butylene carbonates,
(iv) one or more lactates selected from the group consisting of ethyl, propyl, and butyl lactate,
(v) isophorone,
(vi) one or more diesters selected from the group consisting of dimethylsuccinate, dimethyl adipate, diethyl glutarate, and dimethyl glutarate,
wherein said one or more inhibitors are selected from the group consisting of one or more nitrification inhibitors and one or more urease inhibitors wherein the one or more nitrification inhibitors are selected from the group consisting of i) 2-chloro-6-trichloromethyl)pyridine, ii) 4-amino-1,2,4, 6-triazole-HCl, iii) 2,4-diamino-6-trichloromethyltriazine CL-1580, iv) dicyandiamide, v) thiourea, vi) 1-mercapto-1, 2,4-triazole, and vii) 2-amino-4-chloro-6-methylpyrimidine, wherein the one or more urease inhibitors are selected from the group consisting of i) phosphoric triamides, ii) thiophosphoric triamides, and iii) alkylated thiophosphoric triamides, wherein the alkylated thiophosphoric triamides have one or more alkyl groups that independently contain between 1 and 6 carbon atoms and wherein the composition of the delivery formulation comprises less than 1% water.

12. The composition claim 11, wherein of the composition is made by adding said one or more nitrification inhibitors and/or said one or more urease inhibitors to the urea, wherein a) one or more nitrification inhibitors and/or one or more urease inhibitors are dissolved into said organic liquid solvating system, b) optionally one or more dispersed nitrification inhibitors and/or dispersed urease inhibitors are added to the organic liquid solvating system and c) optionally one or more dispersed nitrification inhibitors and/or dispersed urease inhibitors are added to the urea solids and/or the mixtures of liquid ureas.

13. The composition of claim 11, wherein the one or more urease inhibitors comprises N-(n-butyl) thiophosphoric triamide.

14. The composition of claim 11, wherein the composition further comprises the nitrification inhibitor 3,4-dimethylpyrazole phosphate.

15. The composition of claim 11, wherein the composition of the organic liquid solvating system further comprises the protic solvent isopropylidene glycerol.

16. The composition of claim 11, wherein said polyorganic acids and/or their salts comprise one or more members selected from the group consisting of a) monomer, b) homopolymer, c) a copolymer and d) a terpolymer wherein said polyorganic acids comprise one or more members selected from the group consisting of:
i) aspartic acid,
ii) glutamic acid,
iii) maleic anhydride,
iv) itaconic anhydride,
v) citraconic anhydride, and
vi) acrylic acid
wherein the salts of the polyorganic acids are a result of a reaction with one or more neutralizing compounds selected from the group consisting of: NaOH, KOH, $NH_3$, $K_2CO_3$ $Na_2CO_3$, $KHCO_3$ and $NaHCO_3$.

17. The composition of claim 11, wherein the organic liquid solvating system further comprises one or more members selected from the group consisting of: surfactants, buffers, fragrance/odor masking agents, colorants, micronutrients, drying agents, and flow modifiers.

18. The composition of claim 11, wherein the composition further comprises citric acid and/or its salts.

19. The composition of claim 11, wherein the composition of said delivery formulation comprises 5-50% polyorganic acids and/or their salts and wherein the composition of the organic liquid solvating system comprises less than 1% water.

20. The composition of claim 11, wherein the urea solids comprise granules.

* * * * *